(12) United States Patent
Takahira

(10) Patent No.: US 7,447,377 B2
(45) Date of Patent: Nov. 4, 2008

(54) IMAGE PROCESSING METHOD AND APPARATUS, AND IMAGE PROCESSING PROGRAM

(75) Inventor: Masayuki Takahira, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 727 days.

(21) Appl. No.: 10/961,379

(22) Filed: Oct. 12, 2004

(65) Prior Publication Data

US 2005/0123214 A1 Jun. 9, 2005

(30) Foreign Application Priority Data

Oct. 10, 2003 (JP) ............................. 2003-352218

(51) Int. Cl.
*G06K 9/40* (2006.01)
(52) U.S. Cl. .................. 382/260; 382/199; 382/266
(58) Field of Classification Search ................. 382/199, 382/263, 264, 266, 260
See application file for complete search history.

(56) References Cited

U.S. PATENT DOCUMENTS 6,055,340 A * 4/2000 Nagao ......................... 382/261
6,285,798 B1 * 9/2001 Lee ............................. 382/260
7,177,481 B2 * 2/2007 Kaji ............................ 382/265

FOREIGN PATENT DOCUMENTS

| JP | 2000-209431 A | 7/2000 |
| JP | 2000-307868 A | 11/2000 |
| JP | 2002-158892 A | 5/2002 |

OTHER PUBLICATIONS

"Handbook of Image Analysis" published by University of Tokyo Press in 1991 and its partial translation.
Japanese Office Action dated Jan. 15, 2008 issued in Japanese Patent Application No. 2003-352218.

* cited by examiner

*Primary Examiner*—Phuoc Tran
(74) *Attorney, Agent, or Firm*—Sughrue Mion, PLLC

(57) ABSTRACT

The image processing method and apparatus separate image data into plural frequency components that are different from each other, calculate a first evaluation value for an edge degree judgment by applying direction-specific templates to remainder frequency components other than a low-frequency component among the plural frequency components, extract an edge portion using the first evaluation value, perform image enhancement processing separately for each of the plural frequency components based on a result of the extraction of the edge portion and synthesize the processed plural frequency components. The image processing program implements the image processing method.

21 Claims, 4 Drawing Sheets

IMAGE PROCESSING METHOD AND APPARATUS, AND IMAGE PROCESSING PROGRAM

This application claims priority on Japanese patent application No. 2003-352218, the entire contents of which are hereby incorporated by reference. In addition, the entire content of literature cited in this specification are incorporated by reference.

BACKGROUND OF THE INVENTION

The present invention relates to an image processing method and apparatus, and an image processing program. In particular, the present invention relates to an image processing method and apparatus capable of performing edge portion extraction with precision and of performing sharpness enhancement processing at high speed, and to an image processing program for implementing the image processing method.

Digital photoprinters have been put into practical use which are each a digital color image reproduction system in which an image signal for each of red (R), green (G), and blue (B), which are the three primary colors, is obtained by photoelectrically reading a color image recorded on a negative film, a reversal film, a color print, or the like using a photoelectric conversion element such as a CCD, the image signal is converted into a digital signal, and various kinds of digital image processing is performed on the digital signal to reproduce the image through outputting onto a recording material such as color paper, or displaying on an image display means such as a CRT.

With such a digital photoprinter, even when a color image is photographed under an inappropriate photographing condition such as underexposure or overexposure, and is recorded on a negative film, a reversal film, a color print, or the like, it is possible to reproduce the image as a color image having a desired color and gradation by performing image processing on an obtained original image signal. In addition, it is also possible to reproduce the color image recorded on the negative film, the reversal film, the color print, or the like as a color image having a different color and gradation as desired.

As such image processing, for instance, sharpness enhancement (sharpening) processing and graininess suppression processing have conventionally been known with which image degradation such as sharpness degradation of an image obtained with a scanner, a photographing camera, a printer, or the like is recovered. To do so, edge portions are first extracted using a template and the graininess suppression processing or the sharpness enhancement processing is then performed using an unsharpness mask (USM) or a Laplacian filter. In this case, however, the processing is performed on the whole of the image, so that there is a disadvantage in that although the sharpness of the image is improved, noises (undesired components) such as graininess are also enhanced accordingly.

In view of the above-mentioned problem, as a technique of suppressing the noises in flat portions and enhancing only edge components, for instance, a selective image sharpening method is known with which instead of uniformly enhancing the whole of an image, the degree of unsharp masking is partially controlled using output image data of a line detection operator with respect to an original image (see "Handbook of Image Analysis" published by University of Tokyo Press in 1991, for instance).

It is described in "Handbook of Image Analysis" that it becomes possible to detect edge strength accurately when direction-specific templates are used as an edge strength calculation means for extracting edge portions. However, there still has a problem in that when the number of directions is increased, the number of the direction-specific templates is increased, leading to the increase of the time for computation.

Also, when a mask size is increased in accordance with the levels and sizes of noises, graininess, and the like, there occurs a problem in that image density gradients in non-edge portions such as a shaded portion of the skin of a human subject are erroneously detected as edges and also it becomes impossible to pick up textures that are smaller than the mask size.

SUMMARY OF THE INVENTION

The present invention has been made in order to solve the conventional problems described above and has an object to provide an image processing method and apparatus, and an image processing program with which it becomes possible to extract only edge portions that are originally desired to be extracted, to extract even small edges with precision, and to perform image enhancement processing at high speed.

In order to attain the object described above, the present invention provides an image processing method comprising separating image data into plural frequency components that are different from each other, calculating a first evaluation value for an edge degree judgment by applying direction-specific templates to remainder frequency components other than a low-frequency component among the plural frequency components obtained by the separating step, extracting an edge portion using the first evaluation value, performing image enhancement processing separately for each of the plural frequency components based on a result of the extracting step of the edge portion, and synthesizing the plural frequency components resulting from the performing step of the image enhancement processing.

It is preferable that the image processing method further comprises calculating a second evaluation value for detecting small textures by using a template that is smaller than the direction-specific templates used in the calculating step of the first evaluation value.

It is also preferable that the image processing method further comprises correcting the first evaluation value and the second evaluation value in accordance with a value of one of a pixel of interest and the low-frequency component, comparing the corrected first evaluation value and the corrected second evaluation value with each other, and setting greater one of the corrected first evaluation value and the corrected second evaluation value as a first final evaluation value.

And, it is further preferable that the image processing method further comprises setting respective gains, by which the remainder frequency components are to be multiplied respectively, in accordance with a magnitude of the first final evaluation value.

Preferably, the remainder frequency components include a high-frequency component and a middle-frequency component, the image processing method further comprising correcting the first evaluation value and the second evaluation value in accordance with a value of one of a pixel of interest and the low-frequency component, setting the corrected first evaluation value as a second final evaluation value for the high-frequency component, comparing the corrected first evaluation value and the corrected second evaluation value with each other, and setting greater one of the corrected first evaluation value and the corrected second evaluation value as a third final evaluation value for the middle-frequency component.

Further, it is preferable that the image processing method further comprises setting a first gain, by which the high-frequency component is to be multiplied, in accordance with a magnitude of the second final evaluation value, and setting a second gain, by which the middle-frequency component is to be multiplied, in accordance with a magnitude of the third final evaluation value.

In order to attain the object described above, the present invention provides an image processing apparatus comprising separation means for separating image data into plural frequency components that are different from each other, first evaluation value calculation means for calculating a first evaluation value for an edge degree judgment by applying direction-specific templates to remainder frequency components other than a low-frequency component among the plural frequency components separated by the separation means, edge portion extraction means for extracting an edge portion using the first evaluation value, image enhancement processing means for performing image enhancement processing separately for each of the plural frequency components based on a result of edge extraction by the edge portion extraction means, and synthesis means for synthesizing the plural frequency components subjected to the image enhancement processing by the image enhancement processing means.

It is preferable that the image processing apparatus further comprises second evaluation value calculation means for calculating a second evaluation value for small texture detection.

Also, it is preferable that the image processing apparatus further comprises first evaluation value comparison means for correcting the first evaluation value and the second evaluation value in accordance with a value of one of a pixel of interest and the low-frequency component, comparing the corrected first evaluation value and the corrected second evaluation value with each other, and setting greater one of the corrected first evaluation value and the corrected second evaluation value as a first final evaluation value.

It is preferable that the image processing apparatus further comprises gain setting means for setting respective gains, by which the remainder frequency components are to be multiplied respectively, in accordance with a magnitude of the first final evaluation value.

Preferably, the remainder frequency components include a high-frequency component and a middle-frequency component, the image processing apparatus further comprising second evaluation value comparison means for correcting the first evaluation value and the second evaluation value in accordance with a value of one of a pixel of interest and the low-frequency component, setting the corrected first evaluation value as a second final evaluation value for the high-frequency component, comparing the corrected first evaluation value and the corrected second evaluation value with each other, and setting greater one of the corrected first evaluation value and the corrected second evaluation value as a third final evaluation value for the middle-frequency component.

It is preferable that the image processing apparatus further comprises gain setting means for setting a first gain, by which the high-frequency component is to be multiplied, in accordance with a magnitude of the second final evaluation value and setting a second gain, by which the middle-frequency component is to be multiplied, in accordance with a magnitude of the third final evaluation value.

In order to attain the object described above, the present invention provides an image processing program for implementing an image processing method, the image processing method comprising separating image data into plural frequency components that are different from each other, calculating a first evaluation value for an edge degree judgment by applying direction-specific templates to remainder frequency components other than a low-frequency component among the plural frequency components obtained by the separating step, extracting an edge portion using the first evaluation value, performing image enhancement processing separately for each of the plural frequency components based on a result of the extracting step of the edge portion, and synthesizing the plural frequency components resulting from the performing step of the image enhancement processing.

Preferably, the image processing method further comprises calculating a second evaluation value for detecting small textures by using a template that is smaller than the direction-specific templates used in the calculating step of the first evaluation value.

Preferably, the image processing method further comprises correcting the first evaluation value and the second evaluation value in accordance with a value of one of a pixel of interest and the low-frequency component, comparing the corrected first evaluation value and the corrected second evaluation value with each other, and setting greater one of the corrected first evaluation value and the corrected second evaluation value as a first final evaluation value.

Preferably, the image processing method further comprises setting respective gains, by which the remainder frequency components are to be multiplied respectively, in accordance with a magnitude of the first final evaluation value.

Preferably, the remainder frequency components include a high-frequency component and a middle-frequency component, the image processing method further comprising correcting the first evaluation value and the second evaluation value in accordance with a value of one of a pixel of interest and the low-frequency component, setting the corrected first evaluation value as a second final evaluation value for the high-frequency component, comparing the corrected first evaluation value and the corrected second evaluation value with each other, and setting greater one of the corrected first evaluation value and the corrected second evaluation value as a third final evaluation value for the middle-frequency component.

And, preferably, the image processing method further comprises setting a first gain, by which the high-frequency component is to be multiplied, in accordance with a magnitude of the second final evaluation value, and setting a second gain, by which the middle-frequency component is to be multiplied, in accordance with a magnitude of the third final evaluation value.

According to the present invention, image data is separated into multiple frequency components that are different from each other, a first evaluation value for an edge degree judgment is calculated by applying direction-specific templates to frequency components other than a low-frequency component (when the image data is separated into three frequency components that are a low-frequency component, a middle-frequency component, and a high-frequency component, for instance, the templates are applied to the middle- and high-frequency components) and image enhancement processing is performed separately for each frequency component based on the first evaluation value. As a result, it becomes possible to extract only edges that are originally desired to be extracted at high speed by avoiding the influences of shaded portions of an image and the like.

Also, when a second evaluation value is calculated using a template that is smaller than the direction-specific templates, it becomes possible to prevent the omission of picking up of the textures with a large mask and to detect small textures.

DETAILED DESCRIPTION OF THE PREFERRED EMBODIMENT

An image processing method and apparatus, and an image processing program according to the present invention will now be described in detail based on preferred embodiments illustrated in the accompanying drawings.

Figure 1:
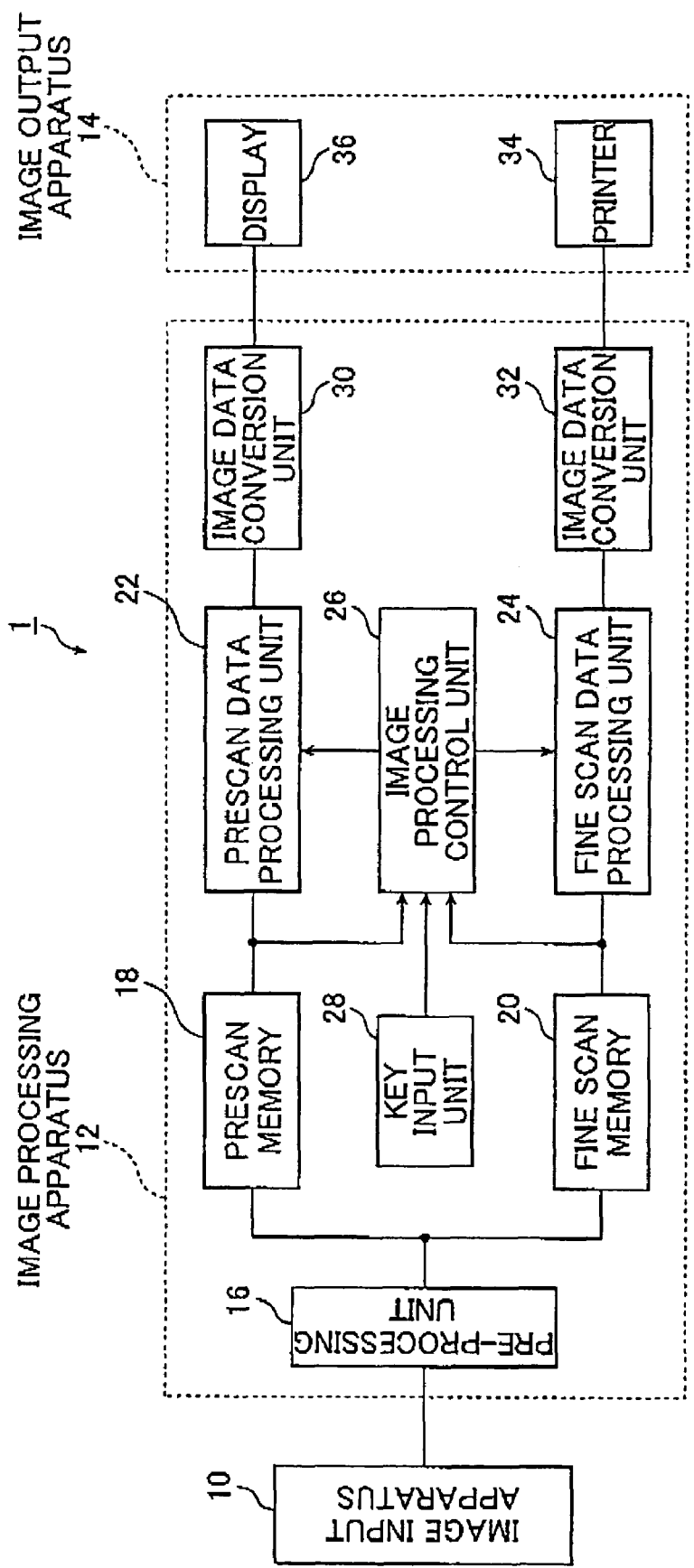
FIG. 1 is a block diagram showing a schematic construction of an embodiment of an image processing system including the image processing apparatus according to the present invention that implements the image processing method according to the present invention.

FIG. 1 is a block diagram showing a schematic construction of an image processing system including the image processing apparatus according to an embodiment of the present invention that implements the image processing method according to the present invention.

As shown in FIG. 1, an image processing system 1 of this embodiment includes an image input apparatus 10 that inputs image data, an image processing apparatus 12 that processes the image data inputted from the image input apparatus 10, and an image output apparatus 14 that outputs the image data processed by the image processing apparatus 12.

The image input apparatus 10 is not specifically limited so long as it is a means for inputting image data. For instance, the image input apparatus 10 may be one of a film scanner, a media driver, and an image data reception apparatus or may be a composite apparatus that integrates their functions and is capable of coping with any image data input.

The film scanner is an apparatus that inputs image data by irradiating light onto a photographic film such as a negative film or a reversal film, and receiving transmission light bearing an image recorded on the photographic film using a CCD.

On the other hand, the media driver is an apparatus that inputs image data by reading the image data from an information recording medium such as a magnetic disk like a flexible disk (FD), an optical disk like a CD-R, a magneto-optical disk (MO), or a PC card in which images photographed with a digital camera have been recorded.

Also, the image data reception apparatus is an apparatus that is connected to a computer network such as the Internet and inputs image data by receiving the image data through the computer network.

The image processing apparatus 12 includes a pre-processing unit 16, a prescan memory 18, a fine scan memory 20, a prescan data processing unit 22, a fine scan data processing unit 24, an image processing control unit 26, a key input unit 28, and image data conversion units 30 and 32.

The pre-processing unit 16 is a unit that is connected to the image input apparatus 10 and performs predetermined pre-processing corresponding to the input means on the image data inputted from the image input apparatus 10. As examples of the pre-processing performed on the image data inputted from the film scanner, it is possible to cite dark current correction, density conversion, shading correction, defective pixel correction, and the like. Also, as examples of the pre-processing performed on the image data inputted from the media driver, it is possible to cite the decompression of image data compressed and recorded in an information storage medium, sharpness improvement, and the like. Further, as examples of the pre-processing performed on the image data inputted from the image data reception apparatus, it is possible to cite the decompression of image data compressed in a format of JPEG or the like and received by the image data reception apparatus and the like.

When the image input apparatus 10 is the film scanner, at the time of reading of an image recorded on a photographic film, it performs image reading twice, that is, performs prescan (first image reading) for reading the image at a low resolution and fine scan (second image reading) for obtaining image data of the image for outputting. Here, the prescan is performed under a prescan reading condition set in advance so that it is possible to read every image on the photographic film to be read with the film scanner without causing saturation of an image sensor (CCD). On the other hand, the fine scan is performed under a find scan reading condition set from prescan data separately for each frame so that the image sensor is saturated at a density that is somewhat lower than the minimum density of the image (frame). It should be noted here that prescan output image signal and fine scan output image signal are fundamentally the same image data except that they are different from each other in resolution and output image signal level.

The prescan memory 18 is a memory for storing image data (prescan data) read through the prescan and the fine scan memory 20 is a memory for storing image data (fine scan data) read through the fine scan.

When the image input apparatus 10 is the media driver or the image data reception apparatus, after the image data inputted from the media driver or the image input apparatus 10 is subjected to the pre-processing in the pre-processing unit 16, the processed image data is outputted to each of the prescan memory 18 and the fine scan memory 20. Here, as to the image data outputted to the prescan memory 18, conversion into image data having a low resolution, which is equal to the resolution of image data obtained by the prescan described above, is performed in the pre-processing unit 16 before the outputting to the prescan memory 18.

The prescan data processing unit 22 is a unit that receives the prescan data from the prescan memory 18 and performs image processing, which is the equivalent of image processing performed in the fine scan data processing unit 24 to be described later, on the received data, thereby creating a simulation image to be displayed for confirmation of a result of the image processing.

The fine scan data processing unit 24 is a unit that receives the fine scan data from the fine scan memory 20, creates image data for outputting by performing various kinds of image processing, in particular, sharpness enhancement (sharpening) processing that is a feature of the present invention on the fine scan data, and outputs the image data for outputting to the image output apparatus 14.

The sharpness enhancement processing will be described in detail later.

The image processing control unit 26 determines processing conditions for the various kinds of image processing to be performed on the fine scan data by the fine scan data processing unit 24 based on the prescan data inputted from the prescan memory 18 through computation (automatic setup) and informs the prescan data processing unit 22 of the determined processing conditions.

Also, connected to the image processing control unit 26 is the key input unit 28. This key input unit 28 is, for instance, composed of a keyboard, a mouse, and the like. The key input unit 28 is a unit from which an operator inputs an instruction into the image processing apparatus 12 while viewing the simulation image displayed on the display apparatus, thereby adjusting the image processing conditions.

The image data conversion unit 30 is connected to the prescan data processing unit 22 and the image data conversion unit 32 is connected to the fine scan data processing unit 24. The image data conversion unit 30 is a unit that converts the simulation image created by the prescan data processing unit 22 into image data for displaying. On the other hand, the image data conversion unit 32 is a unit that converts the image data processed in the fine scan data processing unit 24 into image data to be outputted to the image output apparatus 14 such as a printer.

To be more specific, the image processing apparatus 12 having the construction described above is composed of a computer provided with a CPU, memory (such as a RAM and a ROM), and data input/output ports. Also, by installing the image processing program for implementing the image processing including the sharpness enhancement processing to be described later, it becomes possible to cause the computer to function as the image processing apparatus 12 described above. Here, this image processing program may be stored in a memory in the computer in advance or may be read out from a predetermined recording medium and executed by the CPU of the computer.

The image output apparatus 14 is an apparatus that outputs the image processed in the image processing apparatus 12 and a printer (laser printer) 34 is illustrated in FIG. 1 as the image output apparatus 14. However, the image output apparatus 14 is not limited to this and may be an image display apparatus such as a CRT or a LCD, or a driver that records the image into an image recording medium such as a CD-RW.

In this embodiment, the printer 34 is used as the image output apparatus 14. Therefore, the image data conversion unit 32 converts the image data processed in the fine scan data processing unit 24 into data suited to the output form of the printer 34 and outputs the converted image data to the printer 34.

It should be noted here that a display 36 is connected to the image data conversion unit 30 as a display apparatus and is used to display the simulation image created by the prescan data processing unit 22.

Next, a sharpness processing unit that performs the image sharpness enhancement (sharpening, image enhancement) processing that is a feature of the present invention will be described.

Figure 2:
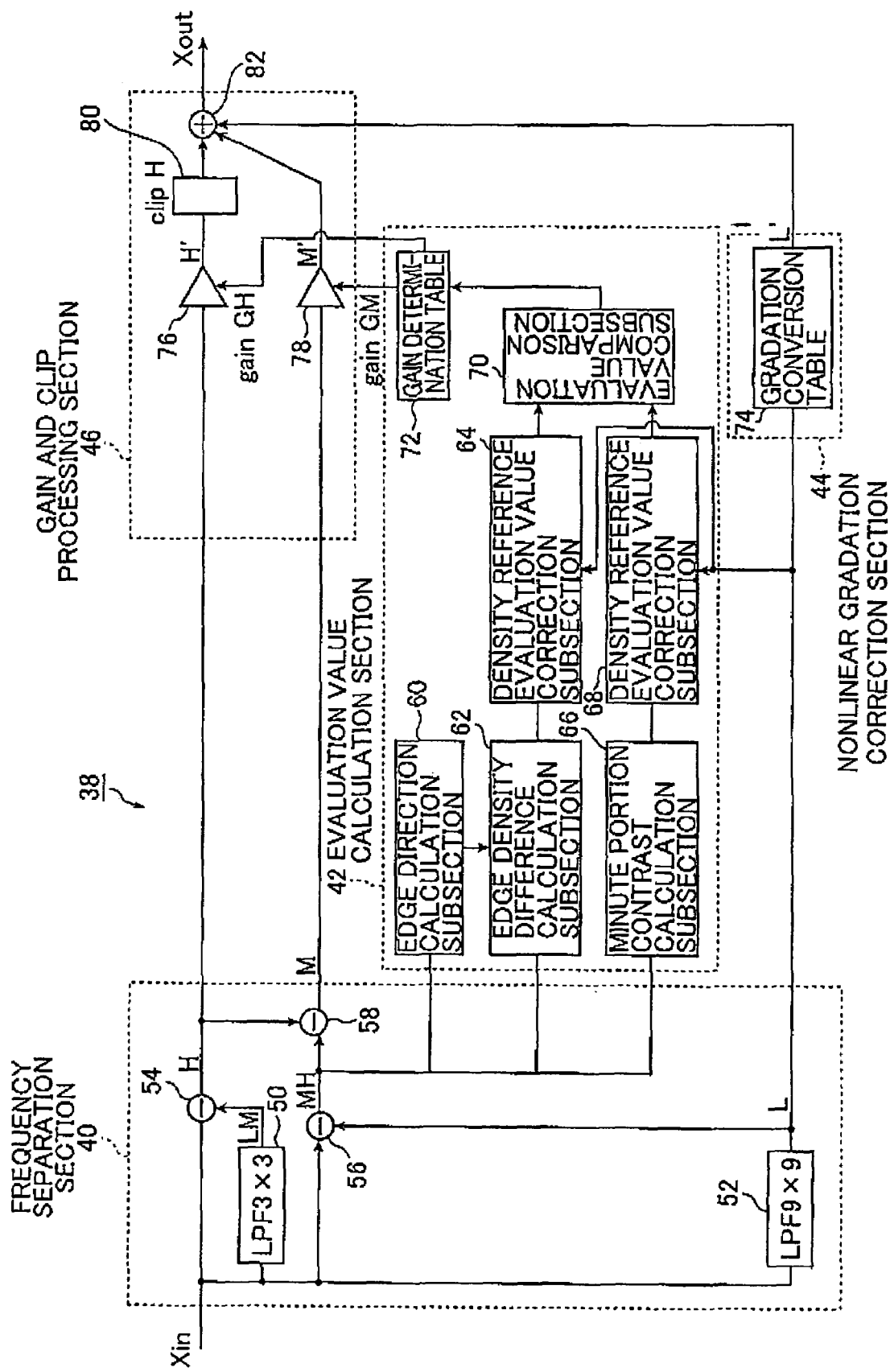
FIG. 2 is a block diagram showing the outline of a form of a sharpness processing section that performs sharpness enhancement processing in the embodiment.

FIG. 2 is a block diagram showing the outline of the sharpness processing unit 38 that performs the sharpness enhancement processing in the fine scan data processing unit 24 in this embodiment. As shown in FIG. 2, the sharpness processing unit 38 that performs the sharpness enhancement processing in this embodiment includes a frequency separation section 40 that separates image data into multiple frequency components, an evaluation value calculation section 42 that calculates evaluation values and determines gains, a nonlinear gradation correction section 44, and a gain and clip processing section 46 that performs gain processing and clip processing on the image data separated into the frequency components.

The frequency separation section 40 is a section that separates image data into a low-frequency component that has a rough image gradient and middle- and high-frequency components containing edge components, texture components, and noise components.

The frequency separation section 40 includes a 3×3 LPF (low-pass filter) 50, a 9×9 LPF 52, and three subtracters 54, 56, and 58. The low- and middle-frequency components LM are separated from the image data $X_{in}$ inputted into the frequency separation section 40 by the 3×3 LPF 50 and the high-frequency component H is separated through the subtraction of these low- and middle-frequency components LM from the original image data $X_{in}$ by the subtracter 54. Also, the low-frequency component L is separated from the original image data $X_{in}$ by the 9×9 LPF 52 and the middle- and high-frequency components MH are separated through the subtraction of this low-frequency component L from the original image data $X_{in}$ by the subtracter 56. The middle- and high-frequency components MH separated by the subtracter 56 is inputted into the evaluation value calculation section 42. Also, the middle-frequency component M is separated through the subtraction of the high-frequency component H from the middle- and high-frequency components MH by the subtracter 58.

It should be noted here that in this embodiment, the image data is separated into the low-frequency component, the middle-frequency component, and the high-frequency component in the manner described above. However, it does not matter into how many components the image data is finally divided so long as sufficient separation is attainable.

The evaluation value calculation section 42 includes an edge direction calculation subsection 60, an edge density difference calculation subsection 62, a density reference evaluation value correction subsection 64, a minute portion contrast calculation subsection 66, a density reference evaluation value correction subsection 68, an evaluation value comparison subsection 70, and a gain determination table 72.

The middle- and high-frequency components MH separated by the frequency separation section 40 are inputted into the edge direction calculation subsection 60, the edge density difference calculation subsection 62, and the minute portion contrast calculation subsection 66. That is, in the present invention, an edge degree judgment is made with respect to the middle- and high-frequency components MH of the image data.

The edge direction calculation subsection 60 is a subsection that obtains the direction of a gradient vector showing the edge direction of a pixel of interest and its surrounding pixels by applying templates to the middle- and high-frequency components MH of the inputted image data. Also, the edge density difference calculation subsection 62 is a subsection that obtains the magnitude of the gradient vector showing an edge strength (edge degree).

For instance, with respect to image data of 3×3 pixels where the pixel of interest exists at its center, product sums of data of each pixel are obtained using eight direction-specific templates composed of 3×3 pixels and respectively exhibiting an upward direction, a downward direction, a rightward direction, a leftward direction, and slanting directions (45°). Then, the direction of the template, with which the maximum product sum has been obtained, is set as the direction of the gradient vector and the maximum product sum is set as the magnitude of the gradient vector, thereby obtaining the edge direction and the edge strength.

In the sharpness enhancement processing, when more importance is placed on accuracy than on processing speed, as many direction-specific templates as the number of the directions are applied, the maximum value is set as the edge strength (first evaluation value), and edge extraction is performed using this edge strength.

When a higher priority is placed on the processing speed than on the accuracy, however, a vertical gradient $g_x$ and a horizontal gradient $g_y$ are obtained and the edge strength is calculated from "$\theta=\arctan(g_x, g_y)$" when calculation is performed in a principle manner or the edge strength is calculated by first calculating the edge direction using a table and then applying a template corresponding to the direction when calculation is performed in an actual manner. Also, the gradient vector may be logarithmic (log)-compressed before referring to the table.

Also, the templates used here are not specifically limited and it is possible to use generally known operators by Robinson, Prewitt, Kirsch, and the like. All of these operators are usable to calculate the magnitude and direction of the density gradient at the pixel of interest.

In reality, however, it is preferable that operators obtained by modifying and expanding these operators be used in order to reduce the influences of graininess and noises as much as possible. In addition, the sizes and shapes of the templates are not specifically limited and it is possible to use various template sizes and shapes.

The edge strength that is the first evaluation value calculated in the edge density difference calculation subsection 62 is inputted into the density reference evaluation value correction subsection 64.

The density reference evaluation value correction subsection 64 is a subsection that receives the edge strength and the low-frequency component L separated by the 9×9 LPF 52 and corrects the edge strength that is the first evaluation value in accordance with the value of the pixel of interest or the low-frequency component. That is, the density reference evaluation value correction subsection 64 is a subsection that corrects the first evaluation value in accordance with the pixel density. Then, the density reference evaluation value correction subsection 64 inputs the corrected first evaluation value into the evaluation value comparison subsection 70.

The minute portion contrast calculation subsection 66 is a subsection that performs processing described below in order to detect small textures with respect to the middle- and high-frequency components MH of the inputted image data, thereby calculating a second evaluation value.

As processing for detecting such small textures, for instance, there is a method with which an evaluation value as to each pixel is first compared with evaluation values of its surrounding pixels and updating is then performed using greater one of the evaluation values. Alternatively, it is possible to use a method with which weighting and averaging processing with the evaluation values of the surrounding pixels is performed.

Still alternatively, the small textures may be detected using a template that is smaller than the templates used to calculate the first evaluation value described above.

Alternatively, the second evaluation value may be calculated by calculating an evaluation value for a color correlation, a weighting and averaging contrast, or dispersion, which is different from the evaluation value described above, in a region that is smaller than the pixel region at the time of the calculation of the first evaluation value.

It should be noted here that when the second evaluation value calculated in this manner greatly differs from the first evaluation value described above in edge degree meaning, these evaluation values are both normalized or one of the evaluation values is normalized in accordance with the other thereof.

The edge strength calculated in the minute portion contrast calculation subsection 66 as the second evaluation value and showing the small textures is inputted into the density reference evaluation value correction subsection 68.

The density reference evaluation value correction subsection 68 is a subsection that corrects the second evaluation value in accordance with the value of the pixel of interest or the low-frequency component, like in the case of the density reference evaluation value correction subsection 64 with respect to the first evaluation value described above. Then, the density reference evaluation value correction subsection 68 inputs the corrected second evaluation value into the evaluation value comparison subsection 70.

It should be noted here that in the density reference evaluation value correction subsection 68, the processing for detecting the small textures described above may be performed after the second evaluation value is corrected in accordance with the value of the pixel of interest or the low-frequency component.

The evaluation value comparison subsection 70 is a subsection that compares the first evaluation value and the second evaluation value corrected in accordance with the pixel density with each other and sets greater one of the evaluation values as a first final evaluation value. When doing so, the enhancement degree in each portion, in which the sharpness is originally high, may be lowered, thereby preventing a situation where the sharpness is enhanced too much.

For the first final evaluation value calculated by the evaluation value comparison subsection 70, a gain GM and a gain GH respectively corresponding to the middle-frequency component M and the high-frequency component H are determined using the gain determination table 72 and are outputted to the gain and clip processing section 46. When doing so, if the first final evaluation value is great, the determined gains become large.

Meanwhile, the nonlinear gradation correction section 44 has a gradation conversion table 74, performs nonlinear gradation correction on the low-frequency component L separated by the 9×9 LPF 52, and outputs the corrected low-frequency component L' to the gain and clip processing section 46.

The gain and clip processing section 46 is a section that performs gain processing on the original image data and performs clip processing particularly on the high-frequency component in accordance with results of the processing described above. The gain and clip processing section 46 includes multiplication circuits 76 and 78, a limiter 80, and an adder 82. The multiplier 76 multiplies the high-frequency component H separated by the frequency separation section 40 by the gain GH outputted from the evaluation value calculation section 42, thereby obtaining a processed high-frequency component H'. On the other hand, the multiplier 78 multiplies the middle-frequency component M separated by the frequency separation section 40 by the gain GM outputted from the evaluation value calculation section 42, thereby obtaining a processed middle-frequency component M'.

The limiter 80 is a section that performs the clip processing on the processed high-frequency component H', thereby preventing image blurring.

The adder 82 re-synthesizes the middle- and high-frequency components subjected to the edge extraction and the gain processing in the manner described above with the low-frequency component subjected to the nonlinear gradation correction, thereby obtaining output image data $X_{out}$.

Next, the image processing method according to the present invention will be described.

If the image input apparatus 10 is the film scanner, for instance, when the operator sets a film and inputs a predetermined instruction from the key input unit 28, the film scanner first starts prescan. Prescan data read through the prescan is subjected to the predetermined pre-processing by the pre-processing unit 16 and is inputted into the prescan memory 18. Following this, the image processing control unit 26 reads out the prescan data from the prescan memory 18, performs various processing such as the creation of a density histogram and the calculation of image characteristic amounts such as highlight and shadow, sets a fine scan reading condition, and supplies the reading condition to the film scanner. The image processing control unit 26 also determines conditions for various image processing such as gradation adjustment and gray balance adjustment, and sets the image processing conditions in the prescan data processing unit 22 and the fine scan data processing unit 24.

The prescan data processing unit 22 reads out the prescan data from the prescan memory 18 and performs the image processing on the prescan data based on the set image processing conditions. The image data subjected to the image processing is converted into image data for displaying in the image data conversion unit 30 and is displayed on the display 36. The operator conducts an inspection while viewing the displayed image and changes the image processing conditions by issuing an instruction from the key input unit 28 as necessary. The changed image processing conditions are set in the fine scan data processing unit 24 through the image processing control unit 26.

Then, the film scanner performs fine scan under the set fine scan reading condition. Fine scan data read through the fine scan is inputted into the fine scan memory 20. The fine scan data processing unit 24 reads out the fine scan data from the fine scan memory 20 and performs the predetermined image processing including the sharpness enhancement processing that is a feature of the present invention on the fine scan data. Then, the processed image data is converted into image data for outputting in the image data conversion unit 32 and is outputted to the printer 34.

The printer (laser printer) 34 modulates R, G, and B laser light emitted from R, G, and B laser light sources based on the image data inputted from the image processing apparatus 12 and scans the modulated laser light onto printing paper by deflecting the laser light using a deflection means such as a polygon mirror, thereby recording an image on the printing paper by exposure. The printing paper, on which the image has been recorded by exposure, is sent to a paper processor in which this printing paper is subjected to various processing such as coloring development, bleaching fixation, and drying, and is outputted as a print where the recorded image has been visualized on the printing paper.

Next, the sharpness enhancement processing performed in the sharpness processing unit 38 during the image processing by the fine scan data processing unit 24 will be described in detail by following a flowchart shown in FIG. 3.

Figure 3:
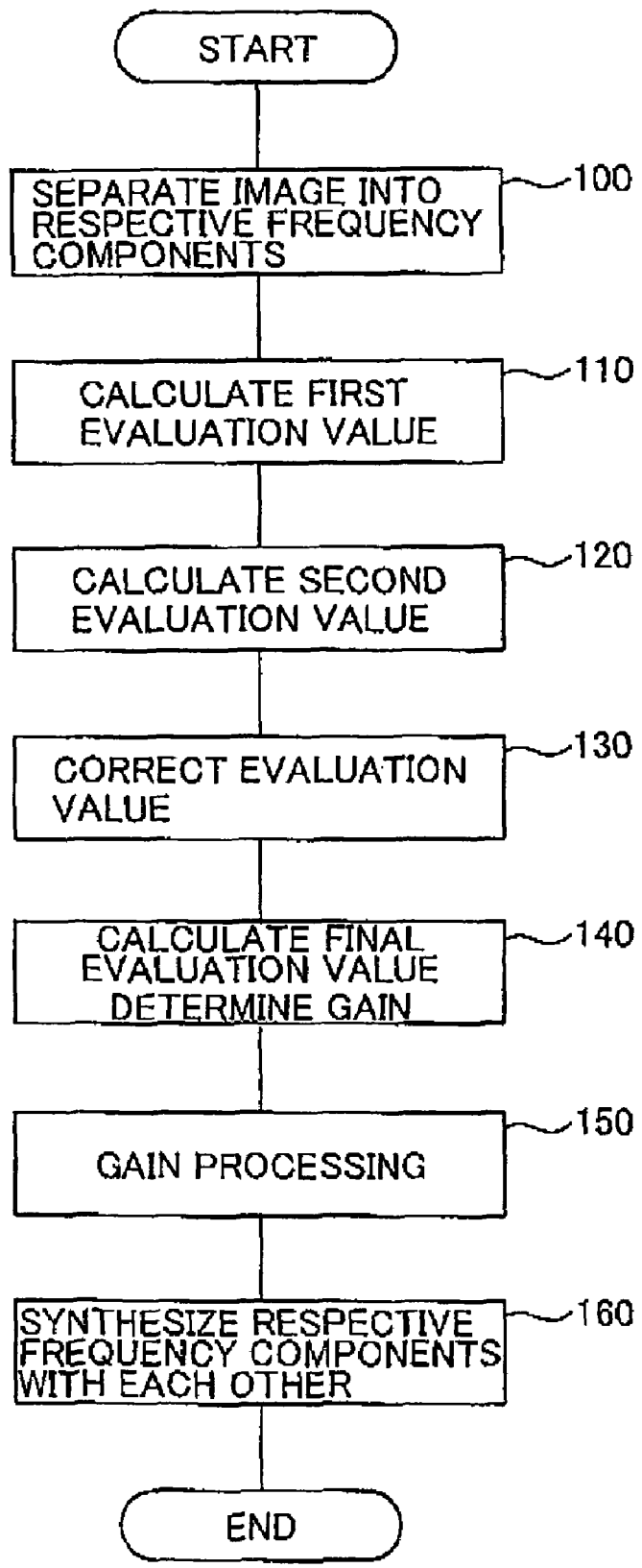
FIG. 3 is a flowchart showing a flow of the sharpness enhancement processing in the embodiment.

First, in step 100 in FIG. 3, in the frequency separation section 40 of the sharpness processing unit 38, the input image data (fine scan data) $X_{in}$ is separated into the respective frequency components that are the low-frequency component L, the middle-frequency component M, and the high-frequency component H.

In particular, in order to perform edge extraction only on the middle- and high-frequency components MH, the middle- and high-frequency components MH obtained by subtracting the low-frequency component L separated by the 9×9 LPF 52 from the image data $X_{in}$ using the subtracter 56 is inputted into the evaluation value calculation section 42.

In step 110, in the edge direction calculation subsection 60 and the edge density difference calculation subsection 62, by obtaining the direction of the gradient vector expressing the edge direction and the magnitude of the gradient vector expressing the edge strength using the templates in the manner described above, the edge strength that is the first evaluation value is calculated. When doing so, it is preferable that the gradient vector be first log-compressed, the edge direction be then calculated by referring to the table, and the edge strength be finally calculated by applying a template corresponding to the direction.

In step 120, in the minute portion contrast calculation subsection 66, the edge strength that is the second evaluation value is calculated.

In step 130, in the density reference evaluation value correction subsections 64 and 68, the first evaluation value and the second evaluation value are respectively corrected in accordance with the value of the low-frequency component L.

In step 140, in the evaluation value comparison subsection 70, the corrected first evaluation value and second evaluation value are compared with each other and greater one of the evaluation values is set as a final evaluation value. Then, this final evaluation value is converted into each of the gain GH for the high-frequency component H and the gain GM for the middle-frequency component M using the gain determination table 72, thereby determining the gains.

Next, in step 150, in the gain and clip processing section 46, the gain processing is performed by multiplying the high-frequency component H by the gain GH and multiplying the middle-frequency component M by the gain GM. In particular, the clip processing is performed by the limiter 80 on the high-frequency component H' after the multiplication.

Finally, in step 160, the high-frequency component H' after the gain processing, the middle-frequency component M' after the gain processing, and the low-frequency component L' subjected to the nonlinear gradation correction are synthesized with each other by the adder 82, thereby obtaining the output image data $X_{out}$.

As described above, according to this embodiment, the edge degree extraction is performed with respect to the middle- and high-frequency components MH using the templates, so that it becomes possible to extract only edges that are originally desired to be extracted by avoiding the influences of shaded portions of an image and the like.

Also, as described above, at the time of calculation of the edge strength that is the first evaluation value, when the gradient vector is first log-compressed, the edge direction is next calculated by referring to the table, and the edge strength is finally calculated by applying a template corresponding to the direction, it becomes possible to pick up small edges with precision while achieving a reduction of the size of the direction table. Also, it becomes possible to compute the gradient vector at high speed using differences from surrounding pixels. Further, the direction calculation only requires the referring to the table, so that it becomes possible to increase the processing speed. Accordingly, it becomes possible to perform the computation at high speed using the maximum values of all results. In addition, an effect is provided that even if the number of directions of the edge extraction is increased, the processing speed will not be lowered.

Also, small textures are detected using a template that is smaller than the templates used to calculate the first evaluation value, so that it becomes possible to prevent the omission of picking up of the textures with a large mask.

Further, in a region that is smaller than the pixel region at the time of calculation of the first evaluation value, an evaluation value for a color correlation, weighting and averaging contrast, or dispersion, which has characteristics that are different from those of the evaluation value described above, is used, so that it becomes possible to perform the detection with higher accuracy by complementing each other's shortcomings.

According to this embodiment, in the sharpness processing unit 38 shown in FIG. 2, the gain GH for the high-frequency component H and the gain GM for the middle-frequency component M are both determined from the first final evaluation value, but the present invention is not limited to this. For instance, a sharpness processing unit 90 shown in FIG. 4 may be used instead in which a second final evaluation value and a third final evaluation value are respectively obtained for the high-frequency component H and the middle-frequency component M, the gain GH for the high-frequency component H is determined from the second final evaluation value, and the gain GM for the middle-frequency component M is determined from the third final evaluation value.

Next, the sharpness processing unit 90 shown in FIG. 4 will be described. This sharpness processing unit 90 has the same construction as the sharpness processing unit 38 shown in FIG. 2 except that an evaluation value calculation section 92 having two gain determination tables 72a and 72b is used in place of the evaluation value calculation section 42 having the gain determination table 72. Therefore, the same construction elements are given the same reference numerals and the detailed description thereof will be omitted.

Figure 4:
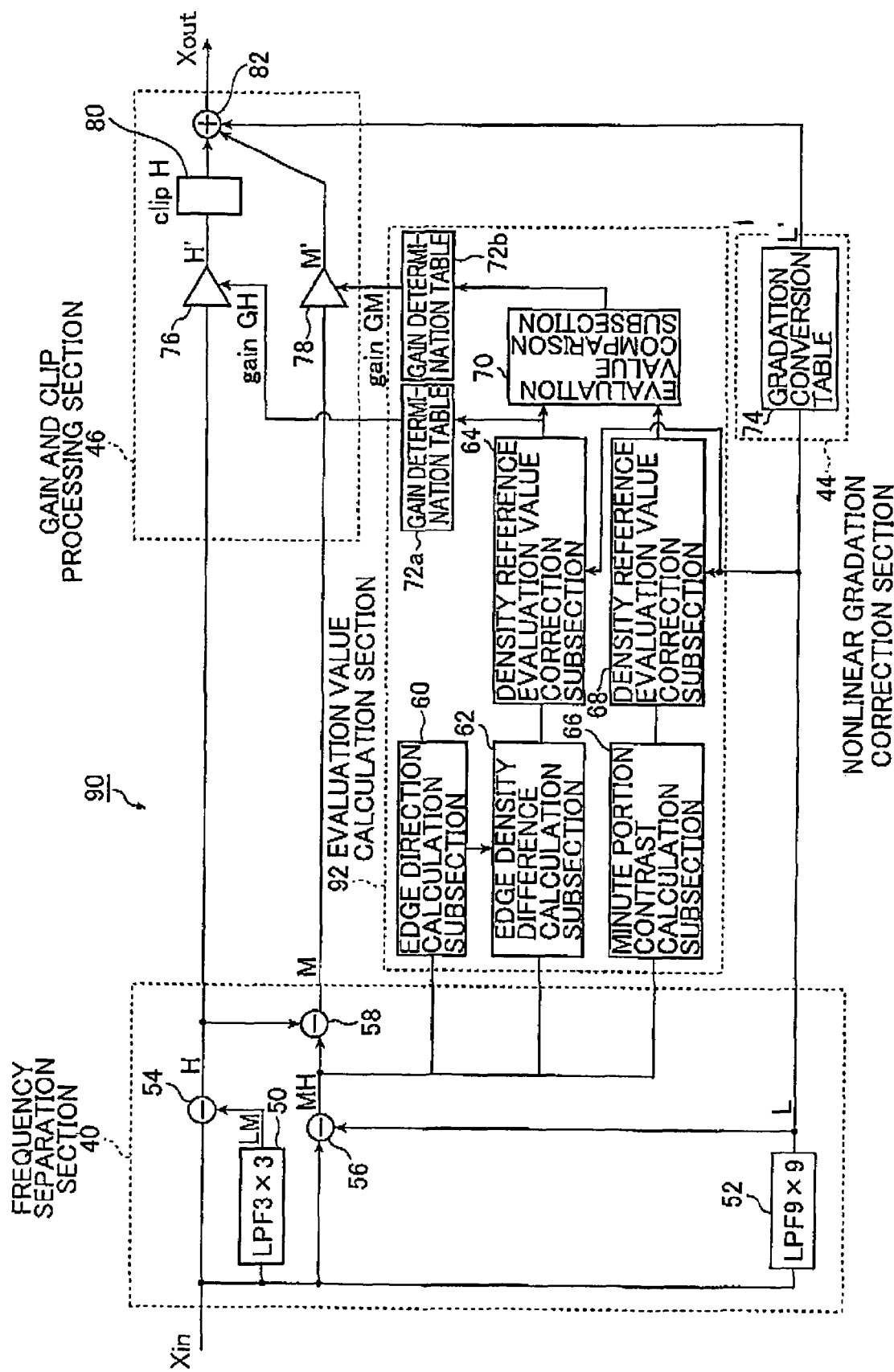
FIG. 4 is a block diagram showing the outline of another form of the sharpness processing section that performs the sharpness enhancement processing in the embodiment.

In completely the same manner as in the case of the evaluation value calculation section 42 shown in FIG. 2, in the evaluation value calculation section 92 of the sharpness processing unit 90 shown in FIG. 4, the density reference evaluation value correction subsections 64 and 68 respectively correct the first evaluation value and the second evaluation value in accordance with the value of the density of the pixel of interest or the low-frequency component L.

Next, in the evaluation value calculation section 92, the first evaluation value corrected in the manner described above is set as the second final evaluation value for the high-frequency component H. Then, this second final evaluation value is converted into the gain GH for the high-frequency component H using the gain determination table 72a, thereby determining a gain by which the high-frequency component H is to be multiplied.

Also, the evaluation value comparison subsection 70 of the evaluation value calculation section 92 compares the first evaluation value and the second evaluation value corrected by the density reference evaluation value correction subsections 64 and 68 with each other and sets greater one of the evaluation values as the third final evaluation value. Next, this third final evaluation value is converted into the gain GM for the middle-frequency component M using the gain determination table 72b, thereby determining a gain by which the middle-frequency component M is to be multiplied.

Next, in the same manner as in the case of the sharpness processing unit 38 shown in FIG. 2, in the sharpness processing unit 90, the gain processing is performed in the gain and clip processing section 46. That is, the high-frequency component H' is obtained by multiplying the high-frequency component H by the gain GH and the middle-frequency component M' is obtained by multiplying the middle-frequency component M by the gain GM. In addition, the clip processing is performed by the limiter 80 on the high-frequency component H' after the multiplication.

In the embodiment described above, the gain processing is performed based on the evaluation values after the separation into the frequencies, but the application to synthetic weighting with or switching to a result of a morphology filter, a median filter, or the like is also possible, for instance. Also, at the time of generation of the high-frequency component, the processing may be performed while changing the characteristics of the filter in accordance with the edge strength and the edge direction.

Also, the processing in the embodiment described above is RGB processing, but the present invention is not limited to this. That is, the processing may be performed in another color space such as XYZ color space, Lab color space or YCC color space.

Further, as described above, in the above embodiment, the middle- and high-frequency components are separated and the nonlinear gradation correction is performed only on the low-frequency component. This is because if the gamma curve is more steepened in a nonlinear manner for the correction of the film characteristics in the leg and shoulder portions of the curve, noises are emphasized in the portion where the gamma curve was more steepened.

Still further, as another form, instead of determining the edge strength from the middle- and high-frequency components, a secondary differential filter (Laplacian filter) may be used in order to avoid the influences of shaded portions.

In this case, as a method of detecting lines in various directions by rotating a template having directional properties, it is possible to use a Vander Brug's line detection operator or the like (see page 565 of "Handbook of Image Analysis" described above).

The image processing method and apparatus, and the image processing program according to the present invention have been described in detail above. However, the present invention is not limited to the embodiments described above and it is of course possible to make various modifications and changes without departing from the gist of the present invention.

What is claimed is:

1. An image processing method comprising:
   separating image data into plural frequency components that are different from each other;
   calculating a first evaluation value for an edge degree judgment by applying direction-specific templates to remainder frequency components other than a low-frequency component among said plural frequency components obtained by said separating step;
   extracting an edge portion using said first evaluation value;
   performing image enhancement processing separately for each of said plural frequency components based on a result of said extracting step of said edge portion; and
   synthesizing said plural frequency components resulting from said performing step of said image enhancement processing.

2. The image processing method according to claim 1, further comprising:
   calculating a second evaluation value for detecting small textures by using a template that is smaller than said direction-specific templates used in said calculating step of said first evaluation value.

3. The image processing method according to claim 2, further comprising:
   correcting said first evaluation value and said second evaluation value in accordance with a value of one of a pixel of interest and said low-frequency component;
   comparing said corrected first evaluation value and said corrected second evaluation value with each other; and
   setting greater one of said corrected first evaluation value and said corrected second evaluation value as a first final evaluation value.

4. The image processing method according to claim 3, further comprising:
setting respective gains, by which said remainder frequency components are to be multiplied respectively, in accordance with a magnitude of the first final evaluation value.

5. The image processing method according to claim 2,
wherein said remainder frequency components include a high-frequency component and a middle-frequency component,
said image processing method further comprising:
correcting said first evaluation value and said second evaluation value in accordance with a value of one of a pixel of interest and said low-frequency component;
setting said corrected first evaluation value as a second final evaluation value for said high-frequency component;
comparing said corrected first evaluation value and said corrected second evaluation value with each other; and
setting greater one of said corrected first evaluation value and said corrected second evaluation value as a third final evaluation value for said middle-frequency component.

6. The image processing method according to claim 5, further comprising:
setting a first gain, by which said high-frequency component is to be multiplied, in accordance with a magnitude of said second final evaluation value; and
setting a second gain, by which said middle-frequency component is to be multiplied, in accordance with a magnitude of said third final evaluation value.

7. An image processing apparatus comprising:
separation means for separating image data into plural frequency components that are different from each other;
first evaluation value calculation means for calculating a first evaluation value for an edge degree judgment by applying direction-specific templates to remainder frequency components other than a low-frequency component among said plural frequency components separated by said separation means;
edge portion extraction means for extracting an edge portion using said first evaluation value;
image enhancement processing means for performing image enhancement processing separately for each of said plural frequency components based on a result of edge extraction by said edge portion extraction means; and
synthesis means for synthesizing said plural frequency components subjected to said image enhancement processing by said image enhancement processing means.

8. The image processing apparatus according to claim 7, further comprising:
second evaluation value calculation means for calculating a second evaluation value for small texture detection.

9. The image processing apparatus according to claim 8, further comprising:
first evaluation value comparison means for correcting said first evaluation value and said second evaluation value in accordance with a value of one of a pixel of interest and said low-frequency component, comparing said corrected first evaluation value and said corrected second evaluation value with each other, and setting greater one of said corrected first evaluation value and said corrected second evaluation value as a first final evaluation value.

10. The image processing apparatus according to claim 9, further comprising:
gain setting means for setting respective gains, by which said remainder frequency components are to be multiplied respectively, in accordance with a magnitude of said first final evaluation value.

11. The image processing apparatus according to claim 8,
wherein said remainder frequency components include a high-frequency component and a middle-frequency component,
said image processing apparatus further comprising:
second evaluation value comparison means for correcting said first evaluation value and said second evaluation value in accordance with a value of one of a pixel of interest and said low-frequency component, setting said corrected first evaluation value as a second final evaluation value for said high-frequency component, comparing said corrected first evaluation value and said corrected second evaluation value with each other, and setting greater one of said corrected first evaluation value and said corrected second evaluation value as a third final evaluation value for said middle-frequency component.

12. The image processing apparatus according to claim 11, further comprising gain setting means for setting a first gain, by which said high-frequency component is to be multiplied, in accordance with a magnitude of said second final evaluation value and setting a second gain, by which said middle-frequency component is to be multiplied, in accordance with a magnitude of said third final evaluation value.

13. A computer-readable medium on which is embodied an image processing program for implementing an image processing method,
said image processing method comprising:
separating image data into plural frequency components that are different from each other;
calculating a first evaluation value for an edge degree judgment by applying direction-specific templates to remainder frequency components other than a low-frequency component among said plural frequency components obtained by said separating step;
extracting an edge portion using said first evaluation value;
performing image enhancement processing separately for each of said plural frequency components based on a result of said extracting step of said edge portion; and
synthesizing said plural frequency components resulting from said performing step of said image enhancement processing.

14. The computer-readable medium according to claim 13, wherein said image processing method further comprises:
calculating a second evaluation value for detecting small textures by using a template that is smaller than said direction-specific templates used in said calculating step of said first evaluation value.

15. The computer-readable medium according to claim 14, wherein said image processing method further comprises:
correcting said first evaluation value and said second evaluation value in accordance with a value of one of a pixel of interest and said low-frequency component;
comparing said corrected first evaluation value and said corrected second evaluation value with each other; and
setting greater one of said corrected first evaluation value and said corrected second evaluation value as a first final evaluation value.

16. The computer-readable medium according to claim 15, wherein said image processing method further comprises:

setting respective gains, by which said remainder frequency components are to be multiplied respectively, in accordance with a magnitude of the first final evaluation value.

17. The computer-readable medium according to claim 14, wherein said remainder frequency components include a high-frequency component and a middle-frequency component, said image processing method further comprising:

correcting said first evaluation value and said second evaluation value in accordance with a value of one of a pixel of interest and said low-frequency component;

setting said corrected first evaluation value as a second final evaluation value for said high-frequency component;

comparing said corrected first evaluation value and said corrected second evaluation value with each other; and setting greater one of said corrected first evaluation value and said corrected second evaluation value as a third final evaluation value for said middle-frequency component.

18. The computer-readable medium according to claim 17, wherein said image processing method further comprises:

setting a first gain, by which said high-frequency component is to be multiplied, in accordance with a magnitude of said second final evaluation value; and setting a second gain, by which said middle-frequency component is to be multiplied, in accordance with a magnitude of said third final evaluation value.

19. The image processing method according to claim 1, further comprising outputting the processed image to a visible medium or an image recording medium.

20. The image processing apparatus according to claim 7, further comprising an image output means for outputting the image processed.

21. The computer-readable medium according to claim 13, wherein the image processing method further comprises outputting the processed image to a visible medium or an image recording medium.

* * * * *